Figure 1:
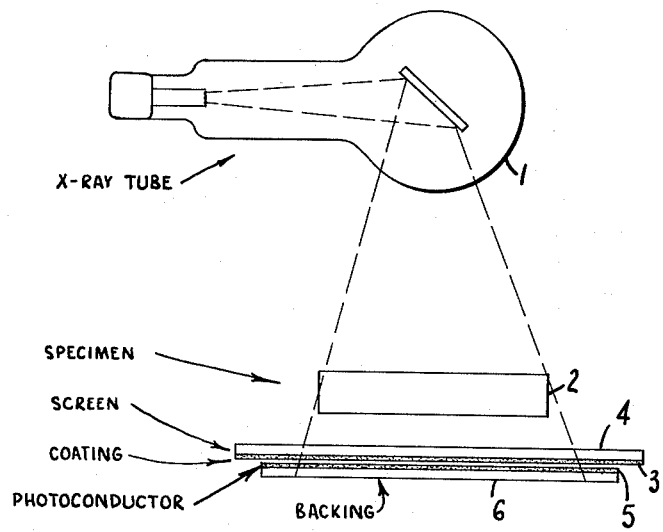

WAVELENGTH OF SCREEN COATING
IN MILLIMICRONS 3,210,543
METHOD OF EXPOSING XERORADIOGRAPHIC FILM IN CONTACT WITH INTENSIFIER SCREEN
Kenneth A. Metcalfe, Fulham, South Australia, Alwin S. Clements, Largs Bay, South Australia, and William H. Lowe, Beaumont, South Australia, Australia, assignors to The Commonwealth of Australia, % the Secretary, Department of Supply, Melbourne, Victoria, Australia
Filed Dec. 5, 1962, Ser. No. 242,434
Claims priority, application Australia, Dec. 8, 1961, 12,200/61
4 Claims. (Cl. 250—65)

This invention relate to an improved method of and means for exposing xeroradiographic film.

When exposing silver halide film to X-rays it is customary to place the film within a light-proof cassette and to make the exposure through an intensifying screen which has the purpose of changing the X-rays to light in the visible or actinic range which will expose the silver halide emulsion.

Exposure is assisted by using a transparent film on which the silver halide emulsion is supported and interposing this film between a pair of screens so that as the X-rays penetrate the screens, both screens will fluoresce and have an additive action in providing light rays from both sides of the silver halide film.

When operating with xerographic materials such as zinc oxide films, it was generally believed that intensifying screens were unnecessary or would not work because exposure of photoconductor film can take place after subjecting such film to corona discharge or similar effects, and it was generally felt that X-rays would similarly charge the film or would modify it to produce a pattern in accordance with the extent of radiation reaching any part of the zinc oxide coating.

While the methods used heretofore with zinc oxide and selenium or similar photoconductor coatings produced results, such results were not particularly effective because a considerable exposure to X-rays was necessary.

It has now been found that much improved results can be obtained by using screens of a nature somewhat similar to the screens used in silver halide photography, but according to this invention a careful selection is made of a screen which emits at a wavelength corresponding to an absorption band of the photoconductor.

The present invention therefore consists in selecting a screen which emits electromagnetic waves in a region corresponding to the absorption bands of the photoconductor medium.

We have found for instance that zinc oxide has a strong absorption band between 300 and 390 millimicrons and again at approximately 520 millimicrons, whereas in the ranges between these values and above the values there is a very little absorption.

If therefore a screen is used with zinc oxide which is energized to emit waves corresponding to these absorption bands, it will be found that conversion of the X-ray energy takes place which will be highly effective in energizing the zinc oxide. According to this invention therefore, using zinc oxide as the photoconductor medium, a screen is selected which will give an emission somewhere between 340 and 400 millimicrons or an emission of approximately 520 millimicrons under influence of X-ray excitation.

With photoconductors other than zinc oxide, such for instance as selenium, the absorption wavelengths are first found and when these are known a screen is selected which will be an emitter of these wavelengths when excited by X-rays.

While it was therefore believed that when carrying out xeroradiography it was only necessary to expose the photoconductor medium directly to the X-rays, and while such methods worked because the photoconductor medium is sensitive to X-rays, it has now been clearly shown by research resulting from our invention that advantages are obtained by using a conversion screen which itself is energized by X-rays to emit rays which in turn are more effective in changing the electrostatic latent image on the photoconductor medium than when using X-rays by themselves.

Figure 2:
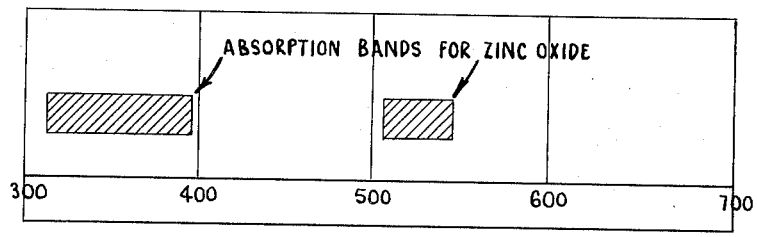

To enable the invention to be more fully understood, an embodiment will now be described with reference to the accompanying drawings in which:

FIG. 1 is a schematic view of an X-ray tube, specimen, screen and photoconductor image sheet as set up when making an exposure, and FIG. 2 is a graph showing the absorption bands for zinc oxide coatings.

The X-ray tube 1 projects its rays through the specimen 2 and coating 3 of the screen 4 onto the photoconductor layer 5 on the backing 6 of the photoconductive sheet being exposed.

The coating 3 of the screen 4 is selected to emit at a wavelength corersponding to the wavelengths of the absorption bands of the zinc oxide or other photoconductor medium, as shown for instance in FIG. 2 of the drawings.

As an example of how screens can be prepared which will effect the necessary conversion of the X-rays to the wavelength range absorbed by the photoconductor medium the following compositions are given:

*Example 1*

For use with zinc oxide electrophotographic sheets, in which case the zinc oxide absorbs strongly in the range 300 to 390 millimicrons, a fluorescent salt such as barium lead sulphate is used in the screen. This emits most strongly at 370 millimicrons. The powdered substance is milled with a resin to form a coating material having the following composition:

|  | Grams |
|---|---|
| Barium lead sulphate | 200 |
| Rhodene M8 resin | 200 |
| Toluene | 500 |
| Copper naphthenate 6% solution | 0.5 |
| Manganese naphthenate 6% solution | 0.5 |

These materials are milled in a single roll mill for half an hour and then used in the proportion 1 part of concentrate to 1 part of toluene in an electrostatic coating bath. Paper or other backings coated electrostatically are cut to size and used in conjunction with a zinc oxide electrophotographic sheet for radiography. The zinc oxide sheet is charged electrically, put in a cassette face to face with the coated side of the screen and exposed to X-rays, whereupon the charge on the zinc oxide is caused to bleed away where the light emitted by the screen impinges on it.

*Example 2*

For use with an antimony trioxide photoconductor in an electrophotographic sheet, in which case the antimony trioxide absorbs strongly up to 430 millimicrons and also at 520 millimicrons, a fluorescent salt such as calcium tungstate is used in the screen. This converts the X-ray energy impinging on it to light having a peak emission at 420 millimicrons. A coating composition is made up in which the calcium tungstate is substituted for the barium lead sulphate in the paint formula of Example 1.

*Example 3*

With bismuth trioxide as the photoconductor in an electrophotographic sheet, it is noted that the absorption of the bismuth trioxide extends strongly through to 520 millimicrons, so that a calcium tungstate screen which emits strongly in the region 400 to 460 millimicrons will be effective, or zinc sulphide which has a peak at about 520 millimicrons. A coating composition is made up in which the active substance is substituted for the barium lead sulphate of the formula in Example 1.

What we claim is:

1. The method of exposing a xerographic film to X-rays which comprises placing a photoconductor layer, adapted for the formation of an electrostatic image, into the path of the X-rays, interposing a specimen between the source of the said X-rays and the photoconductor layer to modify the passage of X-rays and produce an X-ray shadow image of the specimen, forming a screen comprising a particulate salt embedded in an insulating matrix and adapted to emit electromagnetic waves of a wavelength corresponding to at least one of the absorption bands of the photoconductor layer, placing said screen into direct contact with said layer which screen is activated where struck by the X-rays to emit said electromagnetic waves to produce an electrostatic image on said layer, said insulating matrix avoiding destruction of the image, removing the said screen, and subsequently developing the electrostatic image so produced on the said photoconductor film.

2. The method as claimed in claim 1 wherein said photoconductor is zinc oxide having an absorption band between 300 to 390 millimicrons, the screen having a layer of barium lead sulphate applied thereto which emits electromagnetic waves at about 370 millimicrons.

3. The method as claimed in claim 1 wherein said photoconductor is antimony trioxide having an absorption band up to 430 millimicrons, the screen having a layer of calcium tungstate applied thereto which emits electromagnetic waves at about 420 millimicrons.

4. The method as claimed in claim 1 wherein said photoconductor is bismuth trioxide having an absorption band up to 520 millimicrons, the screen having a layer of calcium tungstate applied thereto which emits electromagnetic waves at about 400 to 460 millimicrons.

References Cited by the Examiner

UNITED STATES PATENTS

| | | | |
|---|---|---|---|
| 2,809,294 | 10/57 | Vyverberg | 250—65 |
| 2,856,535 | 10/58 | Vyverberg | 250—63 X |
| 2,921,201 | 1/60 | Lieb | 250—80 |
| 2,990,308 | 6/61 | Goldstein | 250—80 X |
| 3,023,313 | 2/62 | Me La Mater et al. | 250—80 |
| 3,023,340 | 2/62 | Repsher | 250—80 X |
| 3,030,541 | 4/62 | Hanlet | 250—80 X |
| 3,043,710 | 7/62 | Patten et al. | 250—80 X |
| 3,046,154 | 7/62 | Feldman | 250—80 X |

FOREIGN PATENTS 621,931   6/61   Canada.

RALPH G. NILSON, *Primary Examiner.*